United States Patent
Pascal et al.

(10) Patent No.: US 12,044,193 B2
(45) Date of Patent: Jul. 23, 2024

(54) THRUST REVERSER COMPRISING DOORS AND AT LEAST ONE RETRACTABLE DEFLECTOR FOR CLOSING A LATERAL OPENING

(71) Applicant: SAFRAN NACELLES, Gonfreville-l'Orcher (FR)

(72) Inventors: Sebastien Laurent Marie Pascal, Moissy-Cramayel (FR); Patrick Gonidec, Moissy-Cramayel (FR); Alexandre Phi, Moissy-Cramayel (FR); Paul Ferrey, Moissy-Cramayel (FR)

(73) Assignee: SAFRAN NACELLES, Gonfreville-L'Orcher (FR)

( * ) Notice: Subject to any disclaimer, the term of this patent is extended or adjusted under 35 U.S.C. 154(b) by 134 days.

(21) Appl. No.: 17/790,684

(22) PCT Filed: Dec. 18, 2020

(86) PCT No.: PCT/FR2020/052554
§ 371 (c)(1),
(2) Date: Jul. 1, 2022

(87) PCT Pub. No.: WO2021/136902
PCT Pub. Date: Jul. 8, 2021

(65) Prior Publication Data
US 2023/0039569 A1 Feb. 9, 2023

(30) Foreign Application Priority Data

Jan. 2, 2020 (FR) ...................................... 20 00013

(51) Int. Cl.
*F02K 1/60* (2006.01)
*F02K 1/70* (2006.01)

(52) U.S. Cl.
CPC .................. *F02K 1/60* (2013.01); *F02K 1/70* (2013.01); *F05D 2220/323* (2013.01); *F05D 2300/601* (2013.01)

(58) Field of Classification Search
CPC ..... F02K 1/60; F02K 1/62; F02K 1/64; F02K 1/68; F02K 1/52; F02K 1/54; F02K 1/563;
(Continued)

(56) References Cited

U.S. PATENT DOCUMENTS 2,620,622 A    12/1952  Klas et al.
2,933,890 A    4/1960   Morrison
(Continued)

FOREIGN PATENT DOCUMENTS

FR    2 764 340 A1    12/1998

OTHER PUBLICATIONS

International Search Report issued Apr. 9, 2021 in PCT/FR2020/052554 filed Dec. 18, 2020, 2 pages.
(Continued)

*Primary Examiner* — Michael C Zarroli
*Assistant Examiner* — Peter A Taraschi
(74) *Attorney, Agent, or Firm* — Oblon, McClelland, Maier & Neustadt, L.L.P.

(57) ABSTRACT

A thrust reverser including doors and at least one flexible deflector obstructing a lateral opening of the thrust reverser when the doors are open. Such a deflector allows better controlling the airflows in thrust reverser configuration and maximizing the counter-thrust force.

12 Claims, 7 Drawing Sheets

(58) Field of Classification Search
CPC ...... F02K 1/566; F02K 1/70; F05D 2220/323; F05D 2300/601; B64D 29/04
See application file for complete search history.

(56) References Cited

U.S. PATENT DOCUMENTS

| | | | | |
|---|---|---|---|---|
| 5,794,433 | A * | 8/1998 | Peters | F02K 1/60 239/265.29 |
| 5,875,995 | A * | 3/1999 | Moe | F02K 1/70 239/265.29 |
| 6,151,884 | A * | 11/2000 | Gonidec | F02K 1/70 239/265.29 |
| 2003/0126856 | A1* | 7/2003 | Lair | F02K 1/383 60/770 |
| 2014/0252161 | A1* | 9/2014 | Gukeisen | B64D 35/02 60/726 |
| 2016/0146113 | A1 | 5/2016 | Zatorski et al. | |
| 2018/0094605 | A1* | 4/2018 | Rosenau | F02K 1/44 |

OTHER PUBLICATIONS

Preliminary French Search Report issued Sep. 1, 2020 in French Patent Application No. 2000013 filed Jan. 2, 2020, 2 pages (with Translation of Category of Cited Documents).

* cited by examiner

THRUST REVERSER COMPRISING DOORS AND AT LEAST ONE RETRACTABLE DEFLECTOR FOR CLOSING A LATERAL OPENING

TECHNICAL FIELD

The invention relates to the field of thrust reversers for aircraft propulsion unit nacelle, and more specifically to the field of door thrust reversers.

In a non-limiting manner, the invention is of particular interest when such a thrust reverser equips a propulsion unit mounted in the vicinity of an empennage, that is to say generally in the rear portion of the fuselage of an aircraft.

STATE OF THE PRIOR ART

Figure 1:
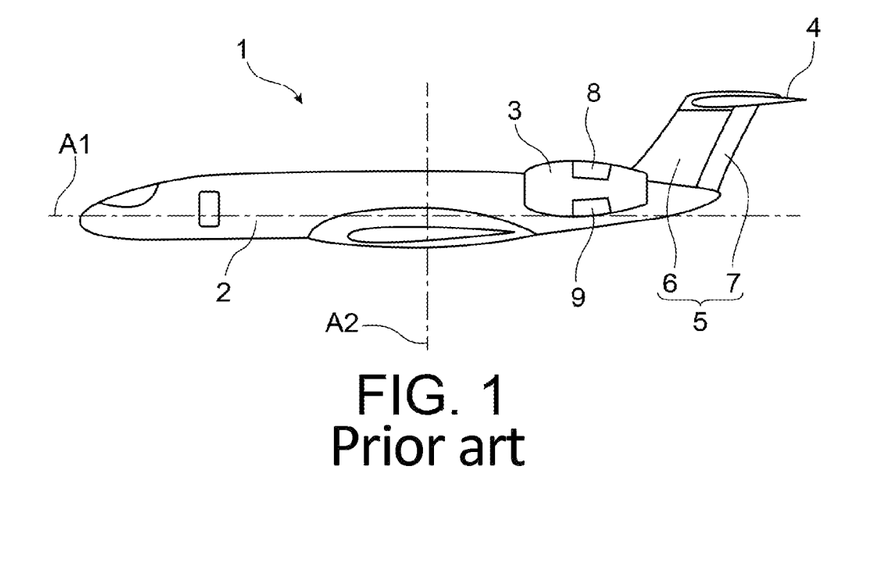
FIG. 1 is a schematic view, already described above, of an aircraft of the prior art, this aircraft comprising propulsion units each equipped with a door thrust reverser.

There is represented, in FIG. 1, a conventional business aircraft 1 extending along a longitudinal axis A1. This airplane 1 comprises a fuselage 2, two propulsion units 3 which are mounted in the rear portion of the fuselage 2 (only one propulsion unit being visible in FIG. 1), a horizontal empennage 4 and a vertical empennage 5. The vertical empennage 5 comprises a fixed portion 6, also called drift, and a movable portion 7, also called steering or symmetry control surface. The drift 6 is intended to stabilise the airplane 1 around a yaw axis A2, in particular in order to keep the longitudinal axis A1 parallel to the axis of the runway during the landing phase in the case of a crosswind (see below). The symmetry control surface 7 is intended to control the moment of the airplane 1 about the yaw axis A2, in particular to be able to maintain the longitudinal axis A1 parallel to the axis of the runway during the landing phase.

Each of the propulsion units 3 comprises a thrust reverser having an upper door 8 and a lower door 9. In FIG. 1, the propulsion units 3 are in a direct thrust configuration in which the doors 8 and 9 are closed so as to close respective reversal openings (not represented in this Figure).

Figure 2:
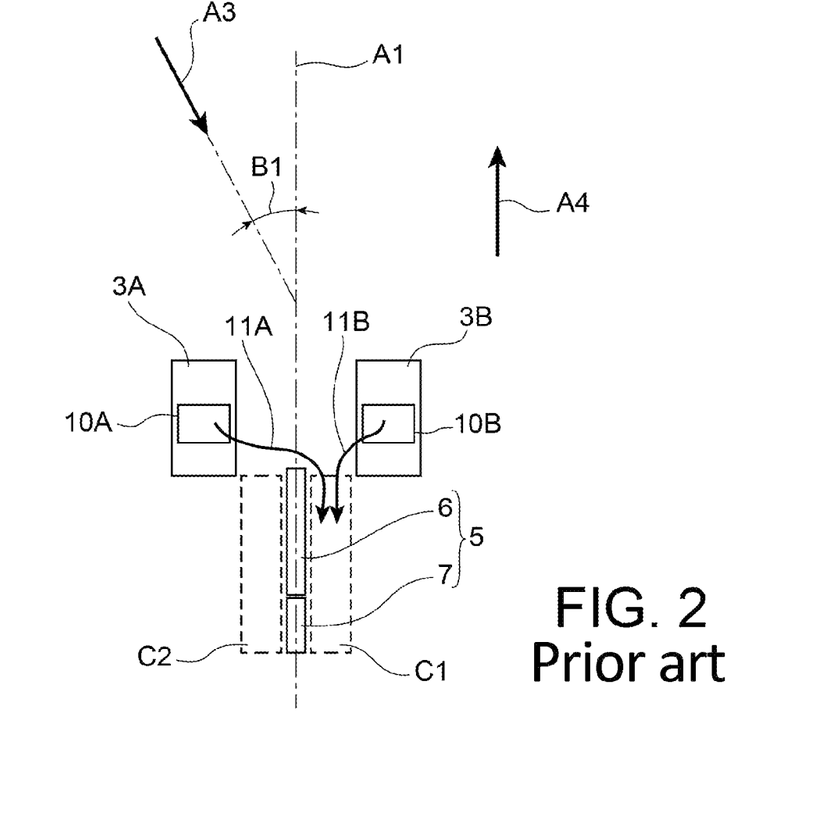
FIG. 2 is a schematic view, already described above, of portions of the aircraft of FIG. 1 during the crosswind landing phase, the thrust reversers being in a thrust reverser configuration.

FIG. 2 schematically represents the two propulsion units (respectively referenced 3A and 3B) as well as the vertical empennage 5 relative to said longitudinal axis A1 and to a relative wind A3. The relative wind A3 is the wind generated by the sum of the displacement of the airplane 1 and the wind. In FIG. 2, the propulsion units 3A and 3B are in a thrust reverser configuration in which said doors (not represented in this Figure) are open so as to release the corresponding reversal openings, namely an upper reversal openings 10A associated with the upper door of the thrust reverser of the propulsion unit 3A and an upper reversal opening 10B associated with the upper door of the thrust reverser of the propulsion unit 3B.

In a manner known per se, the doors of the propulsion units 3A and 3B in the thrust reverser configuration are configured to redirect, in an upstream direction A4, a portion of the air exiting the propulsion units 3A and 3B through the reversal openings 10A/10B.

FIG. 2 illustrates a crosswind landing situation, causing a displacement of the aircraft 1 about the yaw axis A2 so that its longitudinal axis A1 forms an angle B1 with the relative wind direction A3.

Under these conditions, the vertical empennage 5 is likely to be subjected to asymmetric air currents, taking into account in particular the respective trajectories of the air flows exiting the propulsion units 3A and 3B through the upper reversal openings 10A and 10B.

Indeed, a portion of the air exiting the propulsion unit 3B, through the upper reversal opening 10B, typically flows along a trajectory 11B passing through a region C1 extending along one of the faces of the vertical empennage 5 located on the side of this propulsion unit 3B. A portion of the air exiting the propulsion unit 3A, through the upper reversal opening 10A, typically flows along a trajectory 11A bypassing the drift 6 and also passing through the region C1. On the side of the propulsion unit 3A, a region C2 extending along the other face of the vertical empennage 5 thus finds itself undersupplied with air.

The reduced supply of air to drift 6 at the region C2 leads to a loss of stability of the airplane 1.

In addition, the control surface 7 thus emptied of wind at the region C2 has a reduced efficiency likely to lead to a loss of controllability of the airplane 1 and potentially a runway excursion.

DISCLOSURE OF THE INVENTION

One aim of the invention is to provide a door thrust reverser capable of improving the stability and the controllability of an aircraft when the doors are open during the landing phase, in particular in crosswind conditions.

Another aim of the invention is to provide a door thrust reverser allowing improving the thrust reverser performance.

More generally, the invention aims at providing a door thrust reverser allowing better controlling the airflows resulting from the opening of the doors.

To this end, the subject of the invention is a thrust reverser for an aircraft propulsion unit, this thrust reverser comprising a fixed structure and at least one door which is movable between:

- a closed position in which it delimits, with the fixed structure, a flow conduit, the flow conduit comprising an ejection outlet which is at least partially delimited by a rear end of the fixed structure, the door in the closed position being configured to be able to guide a fluid, which is flowing in the conduit, towards the ejection outlet thereof in order to generate a thrust, and
- an open position in which the door releases a reversal opening so as to be able to discharge, from the flow conduit, a portion of said fluid, via this reversal opening, and to redirect at least one portion of the fluid thus discharged towards a front end of the fixed structure in order to generate a counter-thrust.

According to the invention, this thrust reverser comprises at least one deflector which is connected both to the door and to the fixed structure so as to be folded when the door is closed and to be unfolded when the door is open, the unfolded deflector obstructing a lateral opening defined between the fixed structure and a lateral end of the open door.

The obstruction of the lateral opening allows hindering a lateral flow of the fluid exiting the conduit through the reversal opening. Without obstruction of this lateral opening, a portion of the fluid exiting the conduit tends to pass through this lateral opening and to continue its trajectory with a lateral component by disturbing the supply of the empennage.

When the thrust reverser of the invention is fitted to a propulsion unit mounted on an aircraft fuselage, such a deflector allows preventing a portion of the fluid exiting the thrust reverser from causing an asymmetrical supply to the vertical empennage of this aircraft. The invention therefore allows improving the stability and the controllability of the aircraft.

In addition, the thrust reverser of the invention allows improving the thrust reverser performance since at least one portion of the fluid blocked by the deflector can thus contribute to the braking counter-thrust.

Furthermore, the foldable/unfoldable nature of the deflector allows it to be retracted when the door is closed, so as to limit or prevent any interaction of the deflector with the fluid which is flowing in the conduit and/or with the fluid which is flowing outside the thrust reverser. The thrust reverser of the invention thus allows maintaining good direct thrust performance.

According to a first variant, the deflector may comprise movable obstruction blades and one or more connecting rods, each connecting rod being hinged, at one of the ends thereof, on a first adjacent movable blade from said movable blades and, at the other of the ends thereof, on a second adjacent movable blade from said movable blades.

According to this first variant, the deflector can operate according to the principle of a fan.

Preferably, the movable blades can be made of a rigid material, for example a metal material or a composite material.

According to a second variant, the deflector may comprise at least one wall made of flexible material allowing it to be folded when the door is closed and to be unfolded when the door is open.

In the context of this invention, the material of the wall forming the deflector is flexible in that it allows the wall to be folded on itself when the door is closed, and to be unfolded when the door is open.

Preferably, the flexible material may be a textile such as a fabric, for example a fabric comprising organic fibres of the chlorofibre, fluorofibre, acrylic fibre, phenolic fibre, aramid fibre type of polyvinyl alcohol, polyethylene, polypropylene, polyphenylene sulphide, viscose, polyamide, polyester, polyetheretherketone (PEEK), polyetherimide, polyazole, etc., or inorganic fibres of the ceramic fibre type such as silicon carbide, boron carbide fibres, alumina-based ceramic fibres, etc., or else a combination of such fibres.

Such a material allows obtaining the required structural resistance and the resistance to environmental parameters of the deflector such as the temperature and/or the type of fluids to which the deflector is exposed.

In addition, such a material allows limiting the increase in mass linked to the addition of such a deflector.

The deflector can be a combination of the first and second variants described above. For example, the movable blades of the deflector of the first variant may comprise a wall made of flexible material in accordance with the second variant.

In one embodiment, the fixed structure may comprise beams radially delimiting the reversal opening, the deflector being able to be connected to one of these beams.

Preferably, the unfolded deflector may have a tangential span dimension which is greater than or equal to 20%, more preferably greater than or equal to 25%, of a radial distance between a distal end of the open door and the fixed structure.

Preferably, the unfolded deflector can have an axial span dimension which is greater than or equal to 25%, more preferably greater than or equal to 30%, of an axial distance between a front end of the reversal opening and said distal end of the open door.

In one embodiment, the deflector can be configured so as to occupy, when the door is closed, a housing delimited circumferentially between the door and the fixed structure and having a radial dimension which is less than or equal to a thickness of the door.

Thus housed, the folded deflector in no way hinders the fluid flows in the conduit and outside the thrust reverser.

For example, when the door is closed, this housing can be delimited radially inside by an internal surface or wall of the door and/or of the fixed structure and radially outside by an external surface or wall of the door and/or the fixed structure.

Such inner and outer surfaces or walls allowing closing the housing in a sealed manner when the door is closed.

In one embodiment, the at least one deflector can be located on a single side of a first median longitudinal plane of the thrust reverser.

In other words, each deflector which is connected to the door or the fixed structure and which is configured to obstruct a lateral opening of the thrust reverser is in this case located on the same side of the first median longitudinal plane of the thrust reverser.

Thus, when the thrust reverser comprises several deflectors, said deflectors are all located on the same side of the first median longitudinal plane.

More generally, the thrust reverser can therefore be devoid of such a deflector on the other side of the first median longitudinal plane.

The invention also relates to a nacelle for an aircraft propulsion unit, this nacelle comprising a thrust reverser as described above.

The invention also relates to a propulsion unit for an aircraft, this propulsion unit comprising a nacelle as described above.

Finally, the invention also relates to an aircraft comprising such a propulsion unit.

In one embodiment, the aircraft may comprise a fuselage on which the propulsion unit is mounted, the fuselage of the aircraft and the at least one deflector of the thrust reverser being located on the same side of said first median longitudinal plane of the thrust reverser.

Preferably, the aircraft may comprise an empennage, this empennage and said door of the thrust reverser being located on the same side of a second median longitudinal plane of the thrust reverser, this second median longitudinal plane being perpendicular to said first median longitudinal plane.

Other advantages and features of the invention will appear on reading the following detailed, non-limiting, description.

BRIEF DESCRIPTION OF THE DRAWINGS

The following detailed description refers to the appended drawings in which.

DETAILED DESCRIPTION OF THE EMBODIMENTS

Figure 3:
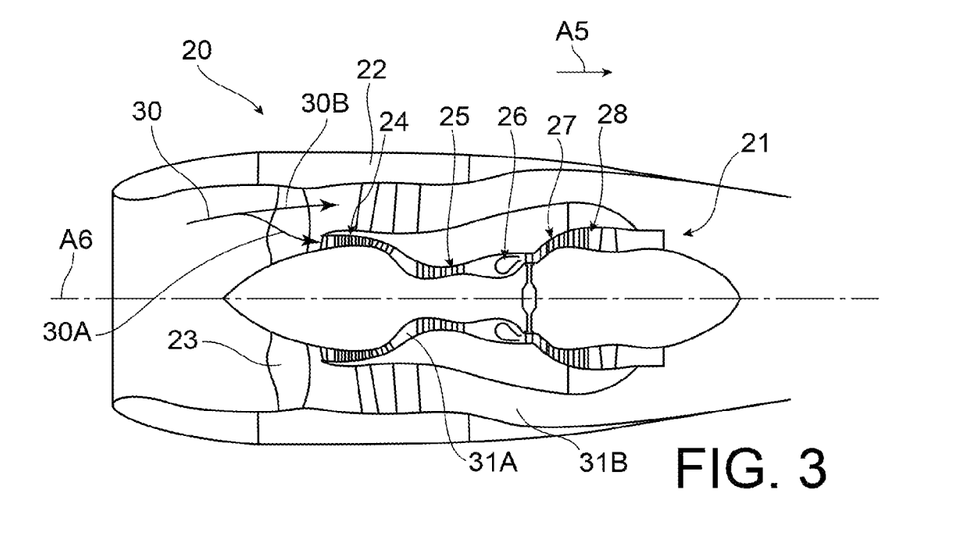
FIG. 3 is a schematic view in axial section of an aircraft propulsion unit.

There is represented in FIG. 3 a propulsion unit 20 intended to be mounted on an aircraft such as the airplane 1 of FIG. 1.

In the present description, the terms "upstream", "downstream", "front" and "rear" are defined relative to an airflow direction A5 around the propulsion unit 20 when the latter generates a thrust, that is to say a direction A5 which is opposite to the direction of displacement of the aircraft that it propels.

In a manner known per se, the propulsion unit 20 comprises a turbomachine 21 shrouded by a nacelle 22. In this example, the turbomachine 21 is a twin-spool and bypass turbojet engine.

The turbojet engine 21 has a longitudinal central axis A6 about which the different components thereof extend, in this case, from the front to the rear of the turbojet engine 21, a fan 23, a low pressure compressor 24, a high pressure compressor 25, a combustion chamber 26, a high pressure turbine 27 and a low pressure turbine 28. The compressors 24 and 25, the combustion chamber 26 and the turbines 27 and 28 form a gas generator.

During the operation of the turbojet engine 21, an air flow 30 enters the nacelle 22 through an air inlet upstream of the propulsion unit 20, passes through the fan 23 then is divided into a central primary stream 30A and a secondary stream 30B. The primary stream 30A flows in a primary gas flow path 31A passing through the gas generator. The secondary stream 30B flows in a secondary flow path 31B surrounding the gas generator and delimited radially outwardly by the nacelle 22

Figure 4:
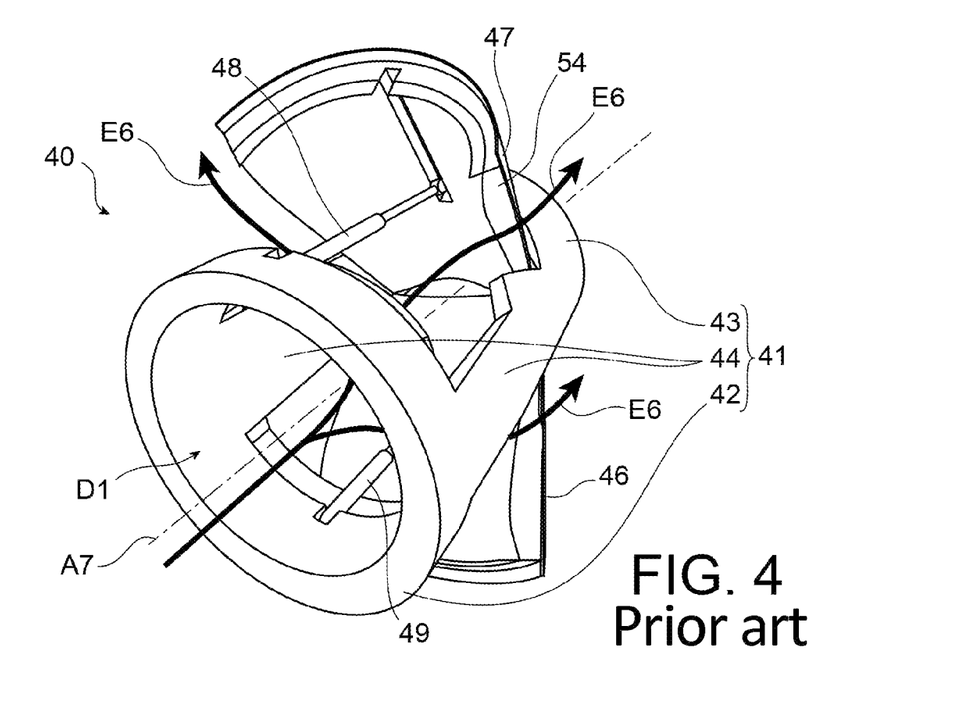
FIG. 4 is a schematic perspective view of a thrust reverser of the prior art, this thrust reverser comprising doors in the open position corresponding to a thrust reverser configuration.

The invention relates more specifically to a thrust reverser 40 of the type illustrated in FIG. 4. In this Figure, the thrust reverser 40 is a thrust reverser of the prior art in the sense that it does not include any deflector for closing the lateral opening (see further below). FIG. 4 thus allows illustrating more specifically the structure of this thrust reverser 40 and certain trajectories of the fluid exiting this thrust reverser 40 when the latter is in a thrust reverser configuration (see further below).

In general, the function of the thrust reverser 40 is to reverse a portion of the thrust generated by the propulsion unit 20 in order to brake the aircraft during its landing.

Of course, the thrust reverser 40 can equip a propulsion unit different from that of FIG. 3 without departing from the scope of the invention.

With reference to FIG. 4, the thrust reverser 40 comprises, on the one hand, a fixed structure 41 extending along a longitudinal central axis A7.

The fixed structure 41 comprises, in this example, a front frame 42, a rear section 43 and two beams 44 connecting the front frame 42 and the rear section 43 to each other.

The front frame 42 has an annular shape configured to connect the thrust reverser 40 to the nacelle 22, according to any conventional assembly technique.

In this example, the rear section 43 has an annular shape defining an ejection shroud. This ejection shroud 43 defines a rear end of both the thrust reverser 40, the nacelle 22 and the propulsion unit 20.

When the thrust reverser 40 is mounted on the propulsion unit 20, the longitudinal central axis A7 of the thrust reverser 40 and the longitudinal central axis A6 of the propulsion unit 20 coincide.

The front frame 42, the rear section 43 and the beams 44 delimit, radially outwardly, a flow conduit D1 for a fluid originating from a portion of the propulsion unit 20 located upstream of the thrust reverser 40.

More specifically, the fluid likely to flow in the conduit D1 is in this example made up of a mixture of gas exiting the primary flow path 31A and of air originating from the secondary flow path 31B, that is to say of a mixture of the primary 30A and secondary 30B streams.

The flow conduit D1 comprises an inlet delimited by the front frame 42 and an ejection outlet delimited by the rear section 43.

In order to be able to perform thrust reversal, the fixed structure 41 comprises, in this example, two reversal openings in the form of radial openings.

Each of these reversal openings is delimited, longitudinally, by the front frame 42 and the rear section 43 and, radially, by the beams 44.

The thrust reverser 40 of FIG. 4 comprises, on the other hand, a movable structure in the form of two pivoting doors 46 and 47.

The doors 46 and 47 are respectively called lower door and upper door, with reference to their relative positioning with respect to the vertical when the thrust reverser 40 is connected to an aircraft in the flight configuration.

Figure 5:
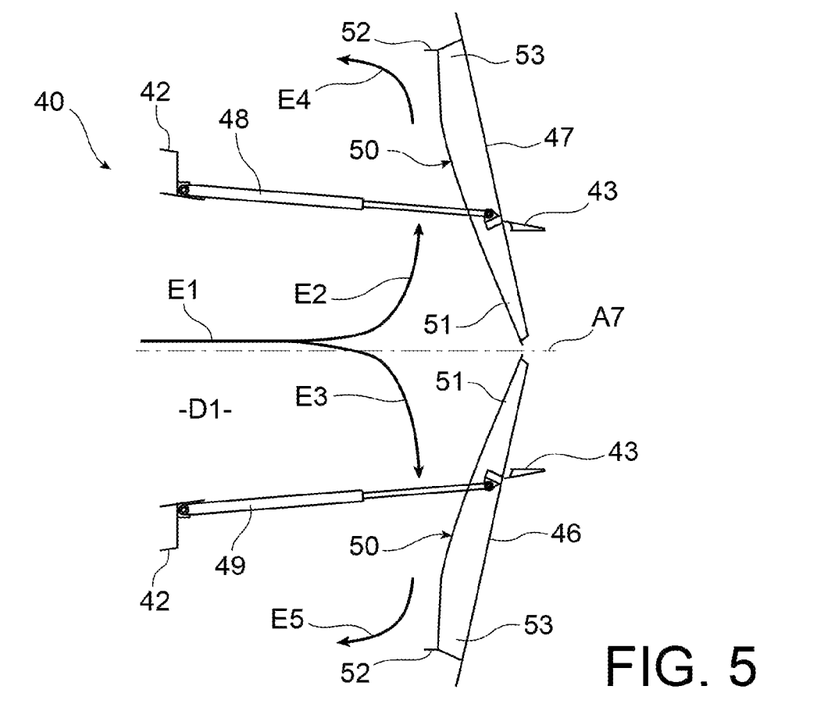
FIG. 5 is a schematic view in axial section of the thrust reverser of FIG. 4, in the thrust reverser configuration.
Figure 6:
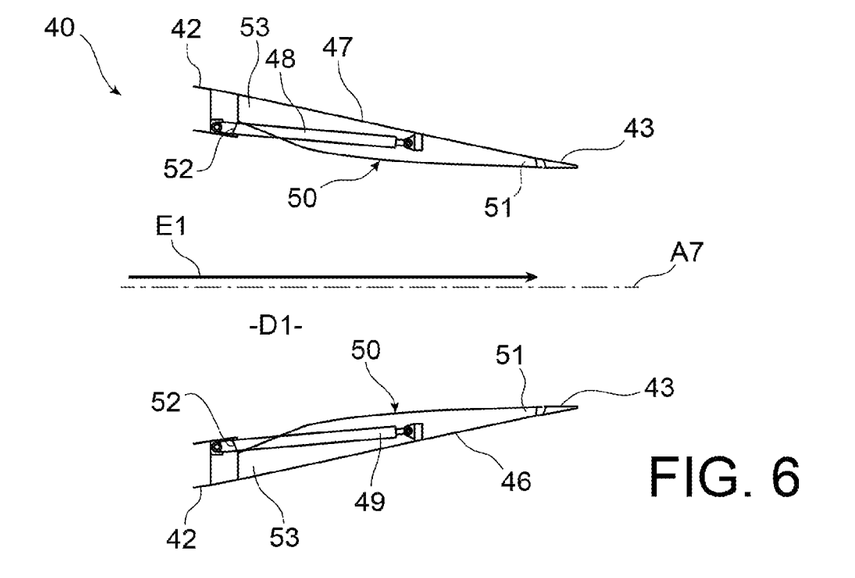
FIG. 6 is a schematic view in axial section of the thrust reverser of FIG. 4, in the direct thrust configuration, the doors being in the closed position.

Each of the doors 46 and 47 is movable relative to the fixed structure 41, about a respective axis of rotation (not represented), between an open position, illustrated in FIGS. 4 and 5, and a closed position illustrated in FIG. 6.

In order to modify the position of the doors 46 and 47, the thrust reverser 40 comprises two cylinders 48 and 49 which are each connected, on the one hand, to the front frame 42 of the fixed structure 41 and, on the other hand, to a respective one of the doors 46 and 47.

With reference to FIG. 6, in which the doors 46 and 47 are in the closed position, each of the doors 46 and 47 closes a respective one of the reversal openings so as to delimit, in continuity with the fixed structure 41, the flow conduit D1.

In the closed position, the doors 46 and 47 allow guiding, towards the ejection outlet, a fluid E1 entering the conduit D1 at the front frame 42 and flowing in the conduit D1 in a direction which is generally parallel to the longitudinal central axis A7. As indicated above, the fluid stream E1 comprises, in this example, a mixture of the primary 30A and secondary 30B streams generated by the operation of the turbojet engine 21.

In this configuration of thrust reverser 40 in which the doors 46 and 47 are in the closed position, the propulsion unit 20 can generate a direct thrust. This configuration of the thrust reverser 40 is called direct thrust, or even "direct jet".

With reference to FIG. 5, in which the doors 46 and 47 are in the open position, the doors 46 and 47 release the reversal openings of the fixed structure 41.

This open position allows discharging from the flow conduit D1, via the reversal openings, portions E2 and E3 of the fluid E1 flowing in the conduit D1. It further allows redirecting at least one portion E4 and E5 of the fluid thus discharged upstream, that is to say in particular towards the front frame 42 of the fixed structure 41 and more generally towards the front of the propulsion unit 20 and the aircraft 1. The fluid thus redirected upstream generates a counter-thrust.

In order to direct the fluid upstream, the doors 46 and 47 each comprise an inner wall 50 having a proximal end 51 configured to extend radially through the flow conduit D1, so as to prevent all or most of the fluid E1, which is flowing in the conduit D1, from continuing its trajectory to the ejection outlet. The orientation of the inner wall 50 is such that the fluid E1 thus blocked continues its trajectory by passing through the reversal openings and by having at least one component oriented upstream.

In a manner known per se, it is possible to maximise this component and improve the thrust reverser performance by placing a spoiler 52 at a distal end 53 of the inner wall 50 of each of the doors 46 and 47.

When the doors 46 and 47 are in the open position, the thrust reverser 40 is in a configuration called thrust reverser configuration, also called "reverse jet" configuration.

In the present description, the expression "open position" designates a position of maximum opening as shown in FIGS. 4 and 5, it being understood that the doors 46 and 47 temporarily occupy intermediate positions during changes in the configuration of the thrust reverser 40.

In practice, the thrust reverser 40 of FIG. 4 does not allow redirecting all fluid E1 upstream when the doors 46 and 47 are open.

In particular, a fraction E6 of the fluid exiting the flow conduit D1 through the reversal openings tends to continue its trajectory downstream by passing through lateral openings respectively defined between lateral ends 54 of the doors 46 and 47 and the beams 44 of the fixed structure 41 when the doors 46 and 47 are open (see FIG. 4).

Not only this fluid fraction E6 opposes the counter thrust, but it is also likely to reduce the stability and the controllability of the aircraft for the reasons set out above with reference to FIG. 2.

In order to overcome one and/or the other of these drawbacks, it is proposed to equip the thrust reverser 40 with at least one deflector as described below with reference to FIGS. 7 to 14.

Each of FIGS. 7 to 14 comprises a reference frame Z1, Z2 and Z3 defining respectively lateral, vertical and longitudinal directions.

Figure 7:
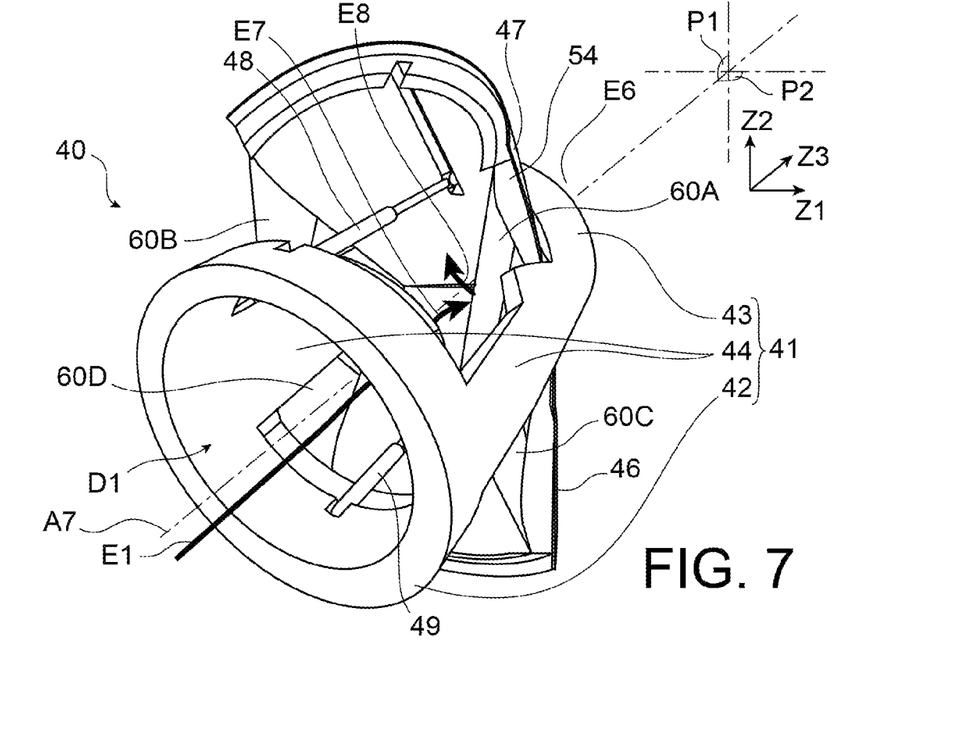
FIG. 7 is a schematic perspective view of a door thrust reverser in accordance with the invention, in the thrust reverser configuration, this thrust reverser comprising a first type of flexible deflectors to close lateral openings.

There is represented in FIG. 7, a thrust reverser 40 which is distinguished from that of FIG. 4 in that it comprises four deflectors 60A, 60B, 60C and 60D.

With reference to this FIG. 7, a first median longitudinal plane P1 and a second median longitudinal plane P2 are defined relative to the aforementioned reference frame. In this example, the median longitudinal plane P1 is a vertical plane parallel to the directions Z2 and Z3 and passing through the longitudinal central axis A7 of the thrust reverser 40 and through the cylinders 48 and 49. The median longitudinal plane P2 is a horizontal plane parallel to the directions Z1 and Z3 which also passes through the longitudinal central axis A7 and which is perpendicular to the vertical plane P1.

FIG. 7 shows the thrust reverser in the thrust reverser configuration.

Each of the deflectors 60A, 60B, 60C and 60D is connected, on the one hand, to one of the doors 46 and 47 and, on the other hand, to one of the beams 44 of the fixed structure 41.

More specifically, the deflector 60A is connected to a first of the beams 44 and to one of the lateral ends 54 of the upper door 47. The deflector 60B is connected to the other beam 44, called second beam, and to the other lateral end of the upper door 47. The deflector 60C is connected to said first beam 44 and to one of the lateral ends of the lower door 46.

The deflector 60D is connected to said second beam 44 and to the other lateral end of the lower door 46.

In this example, each of the deflectors 60A, 60B, 60C and 60D is formed of a wall made of flexible material allowing it to be folded when the door 46 or 47 to which it is connected is closed and allowing it to be unfolded when this door 46 or 47 is open.

In the thrust reverser configuration of FIG. 7, the doors 46 and 47 are in the open position and the unfolded deflectors 60A, 60B, 60C and 60D each obstruct a portion of a respective lateral opening.

Thus, the lateral opening obstructed by the deflector 60A is defined between the first beam 44 and the lateral end 54 of the upper door 47 to which this deflector 60A is connected. The same applies to the other deflectors 60B, 60C and 60D.

With reference to the deflector 60A of FIG. 7, such an obstruction allows blocking a fraction of fluid E7 exiting the flow conduit D1 through the upper reversal opening.

In this example, the deflector 60A further allows redirecting, towards the upper door 47, at least one portion E8 of the fluid thus blocked, which allows increasing the counter-thrust.

Similarly, the other deflectors 60B, 60C and 60D also fulfil these functions of closing and redirecting fluid.

Figure 8:
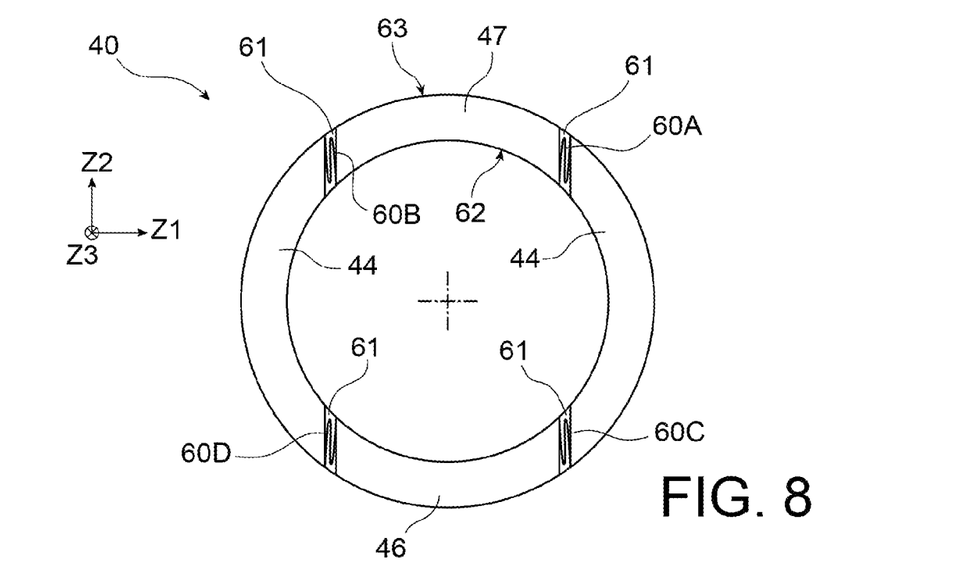
FIG. 8 is a schematic view of the thrust reverser of FIG. 7, in direct thrust configuration, the deflectors being folded within housings each delimited by one of the doors and by a beam of the thrust reverser.

The thrust reverser 40 of the invention is represented in FIG. 8 in the direct thrust configuration.

With reference to this Figure, the deflectors 60A-60D are each configured so as to be folded within a respective housing 61 when the doors 46 and 47 are in the closed position.

Regarding the deflectors 60A and 60B which are connected to the upper door 47, the corresponding housing 61 is delimited, circumferentially, between the upper door 47 and a respective one of the beams 44 and, radially, between an inner surface 62 and an outer surface 63 of the upper door 47, that is to say in the thickness of the door 47.

This applies by analogy to the deflectors 60C and 60D connected to the lower door 46.

Figure 9:
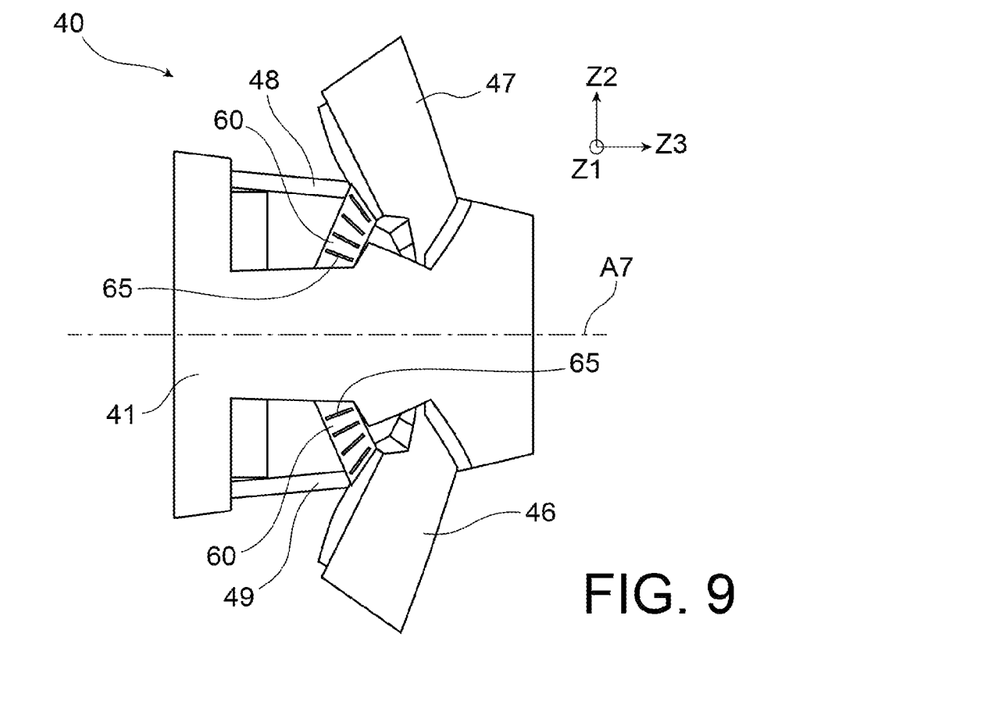
FIG. 9 is a schematic view of a door thrust reverser in accordance with the invention, in the thrust reverser configuration, this thrust reverser comprising a second type of flexible deflectors to close said lateral openings.

FIG. 9 shows a variant which is distinguished from that of FIG. 7 in that the deflectors 60 comprise rods 65 embedded in the fabric of the walls, so as to guide the deflectors 60 when the doors 46 and 47 are closed and thus facilitate their folding within the housing 61 thereof.

In the embodiments of FIGS. 7 to 9, each of the lateral openings is obstructed by one of the deflectors 60, 60A, 60B, 60C or 60D when the doors 46 and 47 are in the open position.

Figure 10:
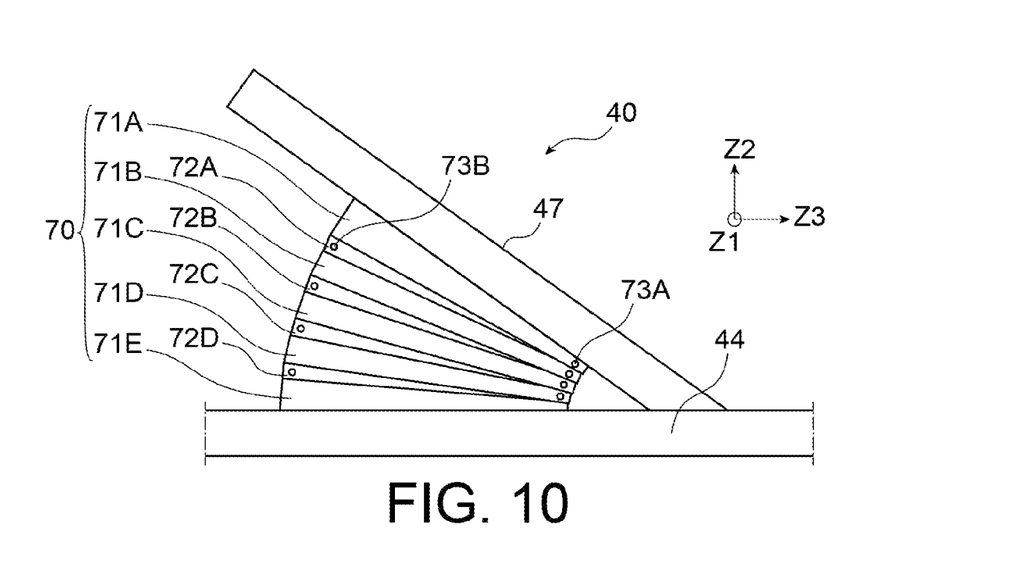
FIG. 10 is a partial schematic view of a door thrust reverser in accordance with the invention, in the thrust reverser configuration, this thrust reverser comprising a deflector provided with a hinge folding/unfolding mechanism.

FIG. 10 shows another type of deflector 70.

The deflector 70 comprises in this example five movable blades 71A-71E and four connecting rods 72A-72D.

Each of the connecting rods 72A-72D is hinged, at one of the ends thereof, on a first adjacent movable blade from said movable blades 71A-71E and, at the other of the ends thereof, on a second adjacent movable blade from said movable blades 71A-71E.

More specifically, the connecting rod 72A is in this example hinged, at one of the ends thereof, called proximal end, to the movable blade 71A, by a first hinge 73A of the pivot type. The connecting rod 72A is hinged at the other of the ends thereof, called distal end, to the movable blade 71B, by a second hinge 73B of the pivot type.

According to the same principle, the connecting rod 72B is hinged to the movable blades 71B and 71C, the connecting rod 72C is hinged to the movable blades 71C and 71D, and the connecting rod 72D is hinged to the movable blades 71D and 71E.

In this example, the movable blade 71A is connected to upper door 47 while the movable blade 71E is connected to the beam 44.

The movable blades 71A-71E are obstruction blades which fulfil the same obstruction function as the flexible wall of the deflectors 60 and 60A-600 in FIGS. 7 and 9.

In particular, the deflector 70 of FIG. 10 is configured such that, in the thrust reverser configuration, the movable blades 71A-71E are disposed side by side so as to obstruct together the lateral opening defined between the corresponding beam 44 and the lateral end of the upper door 47.

Figure 11:
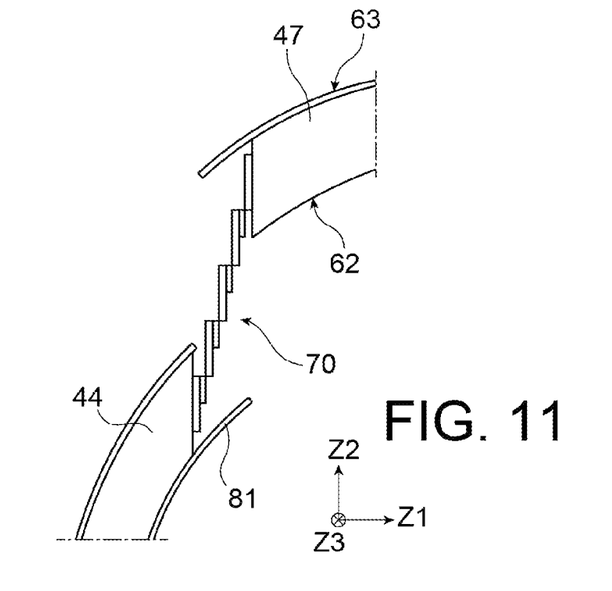
FIG. 11 is a schematic cross-sectional view of the thrust reverser of FIG. 10, in the thrust reverser configuration.
Figure 12:
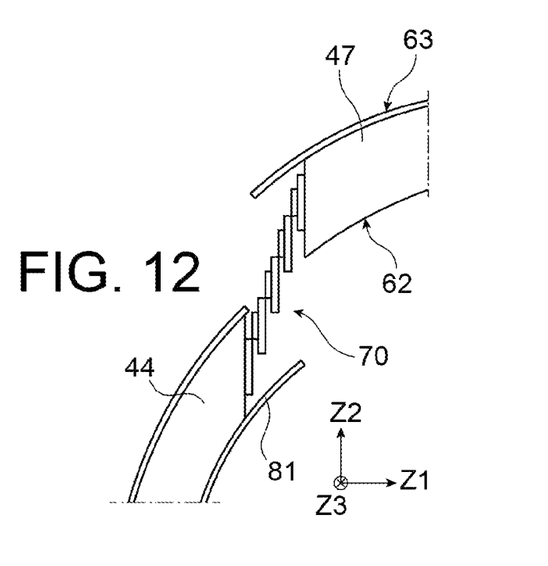
FIG. 12 is a schematic cross-sectional view of the thrust reverser of FIG. 10, in an intermediate configuration.
Figure 13:
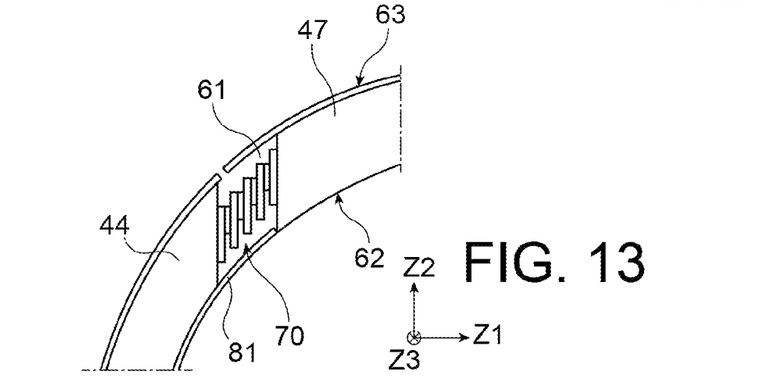
FIG. 13 is a schematic cross-sectional view of the thrust reverser of FIG. 10, in the direct thrust configuration.

FIGS. 11 to 13 show the deflector 70 of FIG. 10 in different configurations. In FIG. 11, the upper door 47 is in the open position. In FIG. 13, the upper door 47 is in the closed position. In FIG. 12, the upper door 47 is in an intermediate position between the open position and the closed position.

In one embodiment which is not represented, the proximal end of each of the connecting rods of the deflector 70 is hinged to a corresponding movable blade by a hinge which coincides with the axis of rotation of the door to which the deflector 70 is connected. It is thus possible to hinge these different elements at the proximal end of the connecting rods by a single hinge.

What has been described above with reference to FIGS. 7 to 9 applies by analogy to the deflector 70 of FIG. 10.

In particular, the deflector 70 is in this example configured so as to be folded within a housing 61 which is delimited circumferentially between the upper door 47 and the corresponding beam 44 and, radially, in the thickness of the upper door 47. When this latter is in the closed position (FIG. 13), the housing 61 is delimited radially inside by an inner wall 81 of the beam 44 and radially outside by a wall carrying said outer surface 63 of the upper door 47.

Similarly, each of the lateral openings of the thrust reverser 40 in the thrust reverser configuration can be obstructed by a deflector similar to the deflector 70 of FIG. 10.

Figure 14:
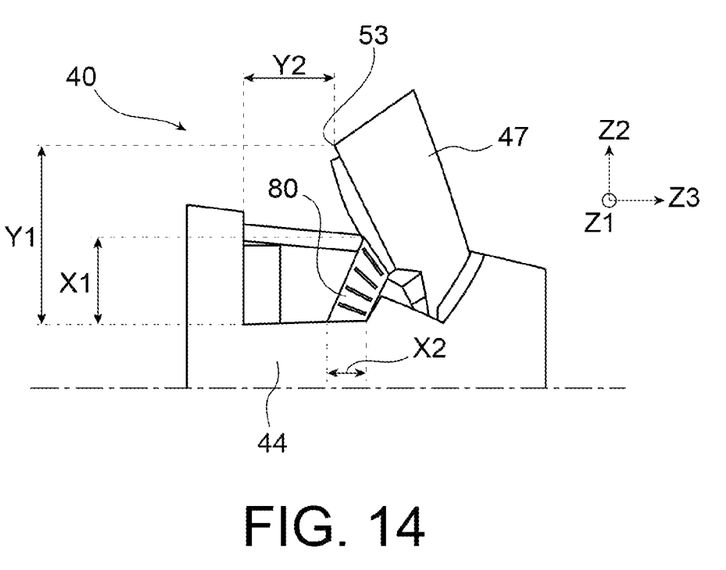
FIG. 14 is a partial schematic view of a door thrust reverser in accordance with the invention, in the thrust reverser configuration, this Figure illustrating the relative dimensions of a deflector for closing the lateral opening.

There is represented in FIG. 14, a thrust reverser 40 of the same type as that of FIG. 9, with a deflector 80 in accordance with the invention. The deflector 80 may be similar to the deflector 60A in FIG. 7, to one of the deflectors 60 in FIG. 9, or to the deflector 70 in FIG. 10.

In this example, the deflector 80 is connected to the upper door 47 and to one of the beams 44 of the fixed structure.

The unfolded deflector 80, that is to say when the upper door 47 is in the open position, has in this example a tangential span dimension X1 corresponding substantially to half the radial distance V1 between the beam 44 and the distal end 53 of the upper open door 47, the distance Y1 being in this example measured at the lateral end of the door 47. Good obstruction performance can be obtained with a dimension X1 which is greater than or equal to 25% of the dimension Y1.

In this example, the unfolded deflector 80 further has an axial span dimension X2 corresponding substantially to half the axial distance Y2 between a front end of the reversal opening and said distal end 53 of the open door 47, the distance Y2 also being measured at the lateral end of the door 47. Good obstruction performance can be obtained with a dimension X2 which is greater than or equal to 30% of the dimension Y2.

Each of the deflectors 60, 60A-600 and 70 described above can have span dimensions of the same order.

In one embodiment which is not represented, in which the thrust reverser 40 equips a propulsion unit 20 mounted on the fuselage 2 of an aircraft such as the airplane 1 of FIG. 1, the thrust reverser 40 comprises a single deflector as described above, for example the deflector 60A of FIG. 7, one of the deflectors 60 of FIG. 9 or the deflector 70 of FIG. 10. This single deflector is connected to the fixed structure 41 and to the upper door 47 so as to be located on the same side as the fuselage 2 relative to the vertical plane P1 and on the same side as the empennage 5 of this aircraft 1 relative to the horizontal plane P2.

The invention is in no way limited to thrust reversers of the type described above. For example, the invention applies analogously to a thrust reverser such as that described in the document FR 2 764 000 A1.

The invention also applies to thrust reversers comprising more than two gates, for example to thrust reversers intended to reverse only the secondary flow of a propulsion unit.

More generally, the principle of the invention can be implemented in any application requiring improving the control of the air jets exiting the thrust reverser in thrust reversal. For example, the invention is also of interest in applications in which the thrust reverser equips a propulsion unit which is mounted under a wing of an aircraft.

The invention claimed is:

1. A thrust reverser for a propulsion unit of an aircraft, said thrust reverser comprising:
   a fixed structure;
   a door which is movable between:
      a closed position in which the door delimits, with the fixed structure, a flow conduit, the flow conduit comprising an ejection outlet which is at least partially delimited by a rear end of the fixed structure, the door in the closed position being configured to be able to guide a fluid, which is flowing in the conduit, towards the ejection outlet thereof in order to generate a thrust, and
      an open position in which the door releases a reversal opening so as to be able to discharge, from the flow conduit, a portion of said fluid, via said reversal opening, and to redirect at least one portion of the fluid thus discharged towards a front end of the fixed structure in order to generate a counter-thrust; and
   a deflector which is directly connected both to the door and to the fixed structure so as to be folded when the door is closed and to be unfolded when the door is open, the unfolded deflector obstructing a lateral opening defined between the fixed structure and a lateral end of the open door.

2. The thrust reverser according to claim 1, wherein the deflector comprises movable obstruction blades and one or more connecting rods, each connecting rod being hinged, at a first end thereof, on a first adjacent movable blade from said movable blades and, at a second end thereof, on a second adjacent movable blade from said movable blades.

3. The thrust reverser according to claim 1, wherein the deflector comprises a wall made of flexible material allowing the wall to be folded when the door is closed and to be unfolded when the door is open.

4. The thrust reverser according to claim 3, wherein the flexible material is a textile.

5. The thrust reverser according to claim 1, wherein the fixed structure comprises beams radially delimiting the reversal opening, the deflector being connected to one of the beams.

6. The thrust reverser according to claim 1, wherein the deflector is configured so as to occupy, when the door is closed, a housing delimited circumferentially between the door and the fixed structure and having a radial dimension which is less than or equal to a thickness of the door.

7. A nacelle for a propulsion unit of an aircraft comprising a thrust reverser according to claim 1.

8. A propulsion unit for an aircraft comprising a nacelle according to claim 7.

9. An aircraft comprising:
a propulsion unit according to claim 8; and
a fuselage on which the propulsion unit is mounted, the fuselage of the aircraft and the deflector of the thrust reverser being located on a same side of a first median longitudinal plane of the thrust reverser.

10. The aircraft according to claim 9, further comprising an empennage, said empennage and said door of the thrust reverser being located on a same side of a second median longitudinal plane of the thrust reverser, said second median longitudinal plane being perpendicular to said first median longitudinal plane.

11. The thrust reverser according to claim 4, wherein the flexible material is a fabric.

12. The thrust reverser according to claim 5, wherein the lateral opening is defined between the lateral end of the open door and the one of the beams to which the deflector is connected, and the deflector is connected to the lateral end of the door.

* * * * *